United States Patent
Gausepohl et al.

(10) Patent No.: US 9,212,297 B2
(45) Date of Patent: Dec. 15, 2015

(54) ADHESIVE APPLICATOR AND APPLICATION SYSTEM

(71) Applicant: PAM Fastening Technology, Inc., Charlotte, NC (US)

(72) Inventors: Bert Martin Gausepohl, Matthews, NC (US); Kenneth Douglas Canup, Matthews, NC (US)

(73) Assignee: PAM Fastening Technology, Inc., Charlotte, NC (US)

( * ) Notice: Subject to any disclaimer, the term of this patent is extended or adjusted under 35 U.S.C. 154(b) by 288 days.

(21) Appl. No.: 13/889,800

(22) Filed: May 8, 2013

(65) Prior Publication Data
US 2014/0331921 A1 Nov. 13, 2014

(51) Int. Cl.
*B43K 29/00* (2006.01)
*C09J 5/00* (2006.01)
*B05C 5/00* (2006.01)

(52) U.S. Cl.
CPC ..... *C09J 5/00* (2013.01); *B05C 5/00* (2013.01)

(58) Field of Classification Search
CPC ................................ B05C 5/00; B05C 5/0204
USPC .................. 401/193, 147, 1–2; 118/300, 207
See application file for complete search history.

(56) References Cited

U.S. PATENT DOCUMENTS

| | | | | |
|---|---|---|---|---|
| 1,956,848 A * | 5/1934 | Barden | ............................. | 401/6 |
| 2,862,382 A * | 12/1958 | Ames | ............................. | 401/179 |
| 5,228,605 A * | 7/1993 | Schlichenmaier | .......... | 222/611.1 |
| 5,656,126 A * | 8/1997 | Martinez | ........................ | 156/574 |
| 6,866,716 B1 * | 3/2005 | Montemurro | ................. | 118/211 |
| 6,953,298 B2 * | 10/2005 | Healy | ........................... | 401/193 |

FOREIGN PATENT DOCUMENTS

DE    3732157 A1 *  5/1989

* cited by examiner

*Primary Examiner* — Jennifer C Chiang
(74) *Attorney, Agent, or Firm* — Alix, Yale & Ristas, LLP

(57) ABSTRACT

An adhesive applicator nozzle for being attached to an adhesive applicator to apply adhesive to a surface of a structure having an edge to thereafter be adhered to a second structure. The nozzle includes a flow conduit for attachment to the applicator for receiving a delivered adhesive and an adhesive dispensing head having a discharge opening communicating with the flow conduit for receiving the adhesive from the flow conduit and applying the adhesive to the surface of the structure. A dispensing guide is attached to the applicator nozzle and extending forwardly and to one side of the dispensing head for engaging the edge of the surface of the structure and guiding the adhesive onto the surface.

11 Claims, 3 Drawing Sheets

ADHESIVE APPLICATOR AND APPLICATION SYSTEM

TECHNICAL FIELD AND BACKGROUND OF THE INVENTION

This application relates to an adhesive applicator and an adhesive application system. The applicator and system disclosed below relates for purposes of illustration to an adhesive such as a hot melt adhesive, for example, PAMTite™ adhesive dispensed from a glue gun. A PAM Fastening Technology Hot Melt Gun HB220 is one suitable choice. Other types of adhesive and other types of dispensers are also suitable for use, as described below.

Currently, when an installer is installing, for example, carpet tack strips that are applied to the perimeter of a floor to be carpeted, the installer must "freehand" the movement of the gun and application of the adhesive as the applicator moves down the tack strip. This can cause uneven adhesive application, a slower rate of application, and wasted adhesive. The adhesive is typically dispensed through a dispensing head having a width suitable for the width of the tack strip or other structure being glued.

Accordingly, there is a need for an applicator that includes a guide for correctly positioning the applicator nozzle and dispensing head above the tack strip or other structure and guiding the dispensing head as the adhesive is applied. As described below, a roller moves down the front side of the tack strip, while the two hole nozzle applies the adhesive in continuous beads parallel to the sides of the tack strip. At the same time, the installer is applying the proper amount of adhesive.

SUMMARY OF THE INVENTION

It is therefore an object of the present invention to provide an applicator that includes a guide for correctly positioning the applicator nozzle and dispensing head above the tack strip or other structure and guiding the dispensing head as the adhesive is applied.

These and other objects of the invention are achieved by providing an adhesive applicator nozzle for being attached to an adhesive applicator to apply adhesive to a surface of a structure having an edge to thereafter be adhered to a second structure. The nozzle includes a flow conduit for attachment to the applicator for receiving a delivered adhesive and an adhesive dispensing head having a discharge opening communicating with the flow conduit for receiving the adhesive from the flow conduit and applying the adhesive to the surface of the structure. A dispensing guide is attached to the applicator nozzle and extending forwardly and to one side of the dispensing head for engaging the edge of the surface of the structure and guiding the adhesive onto the surface.

According to another embodiment of the invention, the dispensing guide includes a plate for engaging the edge of the surface and guiding the adhesive onto the surface.

According to another embodiment of the invention, the dispensing guide includes an elongate plate positioned in alignment with a longitudinal axis of the dispensing head for engaging the edge of the structure and guiding the adhesive onto the surface.

According to another embodiment of the invention, the dispensing guide includes a plate for engaging the edge of the structure and guiding the adhesive onto the surface, and an adjustment feature for adjusting the length of the plate in relation to the dispensing head.

According to another embodiment of the invention, the plate includes a laterally-projecting extension adapted to extend under and engage an underside surface of the structure as the dispensing head moves along the structure.

According to another embodiment of the invention, the laterally-projecting extension includes a roller adapted to engage and roll along the underside surface of the structure.

According to another embodiment of the invention, the adjustment feature includes a plurality of longitudinally spaced-apart openings in the plate for receiving a connector therein for connecting the plate to the dispensing head.

According to another embodiment of the invention, an adhesive applicator nozzle is provided for being attached to an adhesive applicator to apply adhesive to a surface of a structure having an edge to thereafter be adhered to a second structure, and includes a flow conduit for attachment to the applicator for receiving a delivered adhesive and an adhesive dispensing head having a discharge opening communicating with the flow conduit for receiving the adhesive from the flow conduit and applying the adhesive to the surface of the structure. A dispensing guide is attached to the applicator nozzle and extends forwardly and to one side of the dispensing head for engaging the edge of the surface of the structure and guides the adhesive onto the surface. An elongate plate is positioned in alignment with a longitudinal axis of the dispensing head for engaging the edge of the structure and guiding the adhesive onto the surface. The plate includes an adjustment feature for adjusting the length of the plate in relation to the dispensing head and includes a plurality of longitudinally spaced-apart openings in the plate for receiving a connector therein for connecting the plate to the dispensing head, the plate including a laterally-projecting extension adapted to extend under and engage an underside surface of the structure as the dispensing head moves along the structure. The laterally-projecting extension includes a roller adapted to engage and roll along the underside surface of the structure.

According to another embodiment of the invention, an adhesive application system is provided, and includes an adhesive source that includes an adhesive discharge opening for delivering an adhesive and an adhesive applicator nozzle for being attached to an adhesive applicator to apply adhesive to a surface of a structure having an edge to thereafter be adhered to a second structure. The applicator nozzle includes a flow conduit for attachment to the applicator for receiving a delivered adhesive, and an adhesive dispensing head having a discharge opening communicating with the flow conduit for receiving the adhesive from the flow conduit and applying the adhesive to the surface of the structure. A dispensing guide is attached to the applicator nozzle and extends forwardly and to one side of the dispensing head for engaging the edge of the surface of the structure and guiding the adhesive onto the surface.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
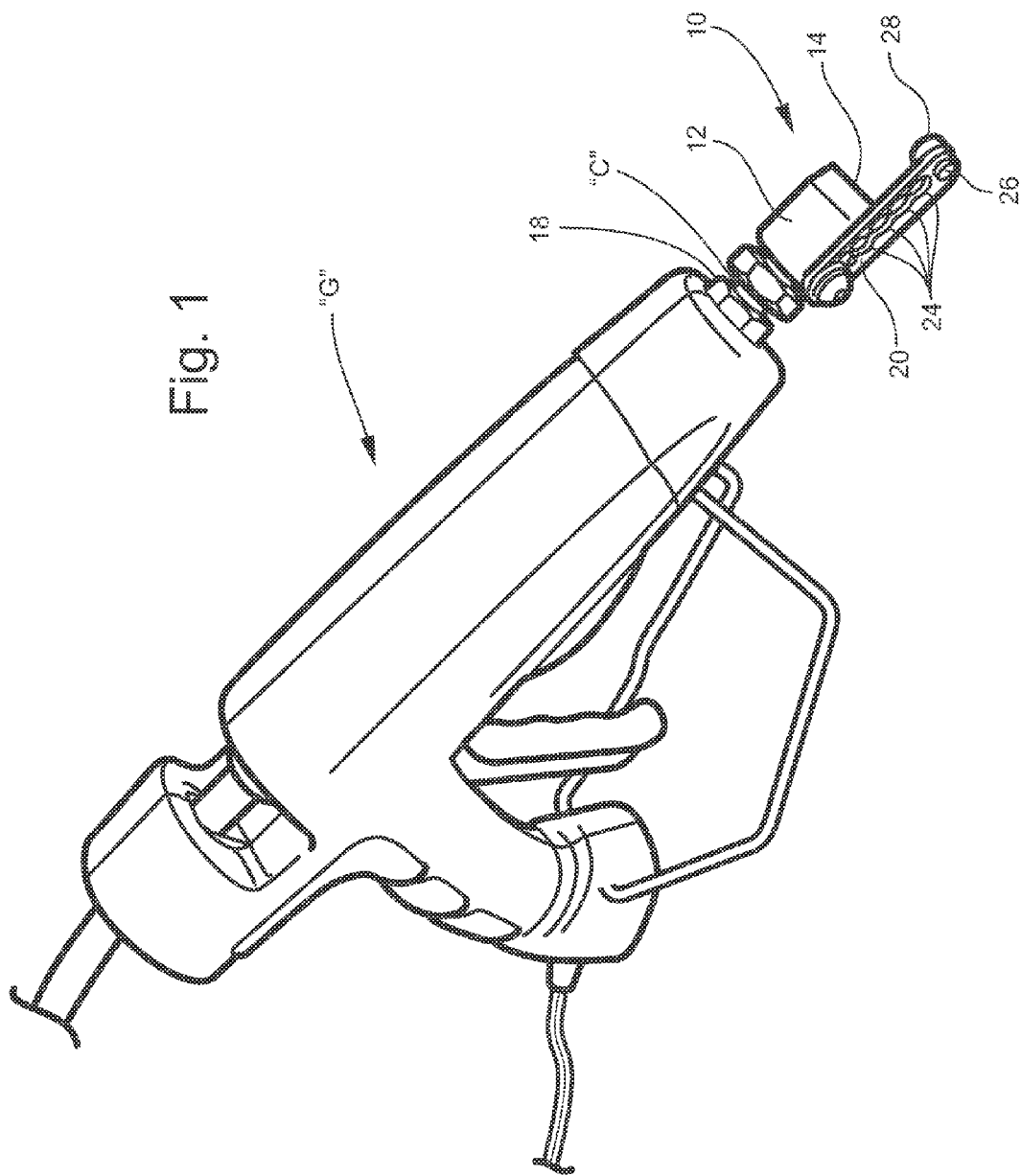
FIG. 1 is an overall perspective view of a hot melt glue gun of a type suitable for use with the applicator nozzle according to one embodiment of the invention in place on the delivery end of the glue gun.

Referring now specifically to the drawings, a glue gun suitable for use with the applicator nozzle and as part of the application system is shown at "G." Electric resistance heat melts a glue stick as it is propelled through the gun "G" and through an output flow conduit "C" that is attached to the applicator nozzle 10, which receives the delivered adhesive. The applicator nozzle includes an adhesive dispensing head 12 having an discharge opening 14 communicating with the flow conduit "C" for receiving the adhesive from the flow conduit "C" and applying the adhesive to the surface of the structure. The applicator nozzle 10 is threaded into the front of the glue gun "G" by a hollow threaded connector 16 and may be locked into place with a nut 18.

Figure 2:
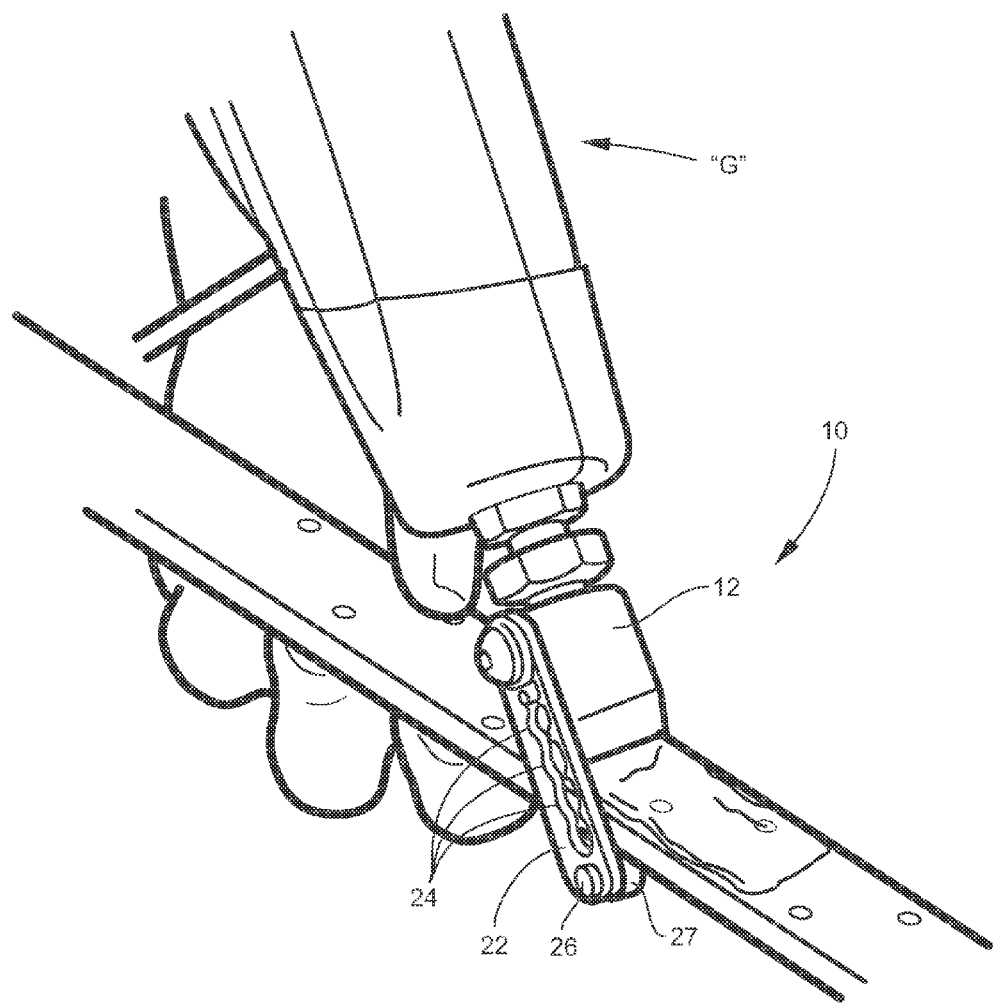
FIG. 2 is a fragmentary enlarged view of the applicator nozzle applying glue to a tack strip.

A dispensing guide 20 is attached to the dispensing head 12 extends forwardly and to one side of the dispensing head 12 for engaging the edge of the surface of tack strip, and guides the adhesive onto the surface, as shown in FIG. 2.

The dispensing guide 20 is formed of an elongate plate 22 bolted at one end to the dispensing head 12 and extending downward and forward of the dispensing head 12. The plate 22 includes a plurality of adjustment notches 24 for permitting adjustment of the length of extension of the plate forward of the dispensing head 12. The forward end of the plate 22 includes a laterally-projecting stub shaft 26 on which is mounted a small roller 28. The roller establishes the correct spacing of the dispensing head 12 from the application surface and reduces friction as the glue gun "G" is moved along the length of the structure to which glue is being dispensed. Alternatively, a pin or other non-rotating, laterally-inwardly extending structure, whether or not cylindrical, can be used.

Figure 3:
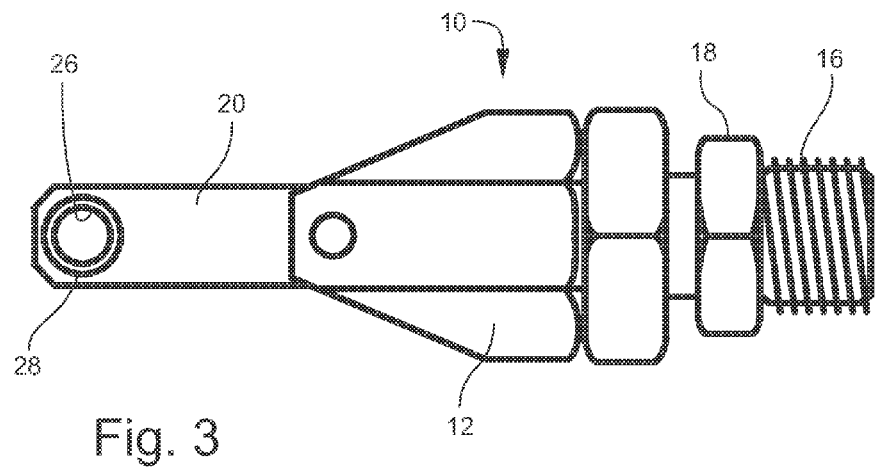
FIG. 3 is a side elevation of an applicator nozzle according to one embodiment of the invention.
Figure 4:
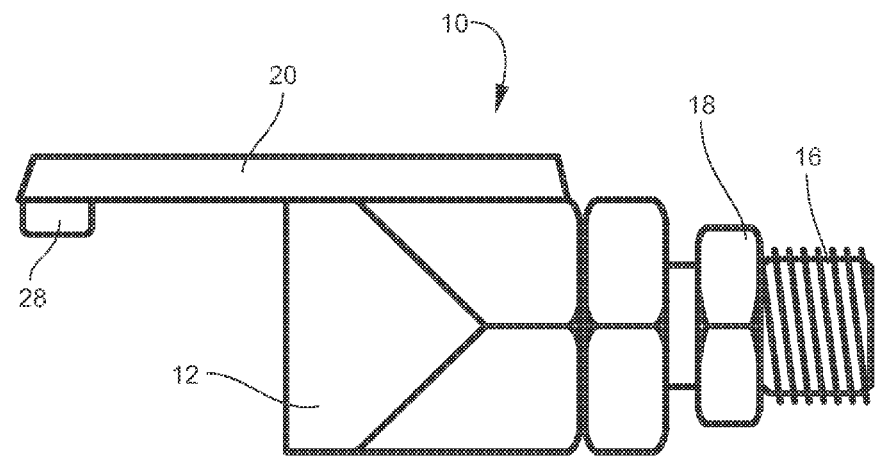
FIG. 4 is a top plan view of an applicator nozzle according to one embodiment of the invention.

Further views of the applicator nozzle 10 is shown in FIGS. 3 and 4.

An applicator nozzle for dispensing an adhesive according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. An adhesive applicator nozzle for being attached to an adhesive applicator to apply adhesive to a surface of a structure having an edge to thereafter be adhered to a second structure, comprising:
    (a) a flow conduit for attachment to the applicator for receiving a delivered adhesive;
    (b) an adhesive dispensing head having a discharge opening communicating with the flow conduit for receiving the adhesive from the flow conduit and applying the adhesive to the surface of the structure; and
    (c) a dispensing guide attached to the applicator nozzle and extending forwardly and to one side of the dispensing head for engaging the edge of the surface of the structure and guiding the adhesive onto the surface, the dispensing guide comprising a plate for engaging the edge of the structure and guiding the adhesive onto the surface, the plate including an adjustment feature for adjusting the length of the plate in relation to the dispensing head.

2. An adhesive applicator nozzle according to claim 1, wherein the dispensing guide comprises an elongate plate positioned in alignment with a longitudinal axis of the dispensing head for engaging the edge of the structure and guiding the adhesive onto the surface.

3. An adhesive applicator nozzle according to claim 1, wherein the plate includes a laterally-projecting extension adapted to extend under and engage an underside surface of the structure as the dispensing head moves along the structure.

4. An adhesive applicator nozzle according to claim 1, wherein the laterally-projecting extension includes a roller adapted to engage and roll along the underside surface of the structure.

5. An adhesive applicator nozzle according to claim 1, wherein the adjustment feature comprises a plurality of longitudinally spaced-apart openings in the plate for receiving a connector therein for connecting the plate to the dispensing head.

6. An adhesive applicator nozzle for being attached to an adhesive applicator to apply adhesive to a surface of a structure having an edge to thereafter be adhered to a second structure, comprising:
    (a) a flow conduit for attachment to the applicator for receiving a delivered adhesive;
    (b) an adhesive dispensing head having a discharge opening communicating with the flow conduit for receiving the adhesive from the flow conduit and applying the adhesive to the surface of the structure;
    (c) a dispensing guide attached to the applicator nozzle and extending forwardly and to one side of the dispensing head for engaging the edge of the surface of the structure and guiding the adhesive onto the surface;
    (d) an elongate plate positioned in alignment with a longitudinal axis of the dispensing head for engaging the edge of the structure and guiding the adhesive onto the surface;
    (e) the plate including an adjustment feature for adjusting the length of the plate in relation to the dispensing head comprising a plurality of longitudinally spaced-apart openings in the plate for receiving a connector therein for connecting the plate to the dispensing head, the plate including a laterally-projecting extension adapted to extend under and engage an underside surface of the structure as the dispensing head moves along the structure; and
    (f) the laterally-projecting extension including a roller adapted to engage and roll along the underside surface of the structure.

7. An adhesive application system, comprising:
    (a) an adhesive source that includes an adhesive discharge opening for delivering an adhesive;
    (b) an adhesive applicator nozzle for being attached to an adhesive applicator to apply adhesive to a surface of a structure having an edge to thereafter be adhered to a second structure, comprising:
        i. a flow conduit for attachment to the applicator for receiving a delivered adhesive;
        ii. an adhesive dispensing head having a discharge opening communicating with the flow conduit for receiving the adhesive from the flow conduit and applying the adhesive to the surface of the structure; and
        iii. a dispensing guide attached to the applicator nozzle and extending forwardly and to one side of the dispensing head for engaging the edge of the surface of the structure and guiding the adhesive onto the surface, the dispensing guide comprising a plate for engaging the edge of the structure and guiding the adhesive onto the surface, the plate including an adjustment feature for adjusting the length of the plate in relation to the dispensing head.

8. An adhesive application system according to claim 7, wherein the dispensing guide comprises an elongate plate positioned in alignment with a longitudinal axis of the dispensing head for engaging the edge of the structure and guiding the adhesive onto the surface.

9. An adhesive application system according to claim 7, wherein the plate includes a laterally-projecting extension adapted to extend under and engage an underside surface of the structure as the dispensing head moves along the structure.

10. An adhesive application system according to claim 7, wherein the laterally-projecting extension includes a roller adapted to engage and roll along the underside surface of the structure.

11. An adhesive application system according to claim 7, wherein the adjustment feature comprises a plurality of longitudinally spaced-apart openings in the plate for receiving a connector therein for connecting the plate to the dispensing head.

* * * * *